United States Patent [19]
Ozdemir

[11] Patent Number: 4,660,742
[45] Date of Patent: Apr. 28, 1987

[54] SYSTEM FOR ACTIVATING A DOSING APPARATUS FOR DISPENSING PREDETERMINED QUANTITIES OF A BEVERAGE FROM A BOTTLE

[76] Inventor: Nazmi Ozdemir, 25 beløgade, 3 tv, 2100 Copenhagen Ø, Denmark

[21] Appl. No.: 629,538

[22] PCT Filed: Nov. 4, 1983

[86] PCT No.: PCT/DK83/00104
§ 371 Date: Jul. 10, 1984
§ 102(e) Date: Jul. 10, 1984

[87] PCT Pub. No.: WO84/01936
PCT Pub. Date: May 24, 1984

[30] Foreign Application Priority Data
Nov. 11, 1982 [DE] Fed. Rep. of Germany ......... 325018
Aug. 3, 1983 [DE] Fed. Rep. of Germany ......... 333541

[51] Int. Cl.⁴ .............................................. B67D 3/00
[52] U.S. Cl. ........................................ 222/36; 222/63; 222/641; 222/153; 222/181; 222/504
[58] Field of Search ................... 222/23, 41, 63, 640, 222/641, 153, 181, 504, 36, 38; 137/356; 248/311.3; 285/DIG. 21, 308; 141/346, 383, 385, 311 R

[56] References Cited
U.S. PATENT DOCUMENTS

| | | | |
|---|---|---|---|
| 3,193,143 | 7/1965 | Maieli | 222/504 |
| 3,258,166 | 6/1966 | Kuckens | 222/504 |
| 3,779,357 | 12/1973 | Haller et al. | 222/153 |
| 3,802,606 | 4/1974 | Gust | 222/504 |
| 4,469,149 | 9/1984 | Walkey et al. | 141/346 |

FOREIGN PATENT DOCUMENTS
419500 3/1967 Switzerland ..................... 248/311.3

Primary Examiner—H. Grant Skaggs
Attorney, Agent, or Firm—Cushman, Darby & Cushman

[57] ABSTRACT

A system for activating a dosing apparatus to dispense predetermined amounts of a beverage from a bottle and comprising a lever arm containing an annular housing, through which a dosing apparatus is inserted. The lever arm annular housing has an annular electromagnet to control a valve in the dosing apparatus, and an optical reader to identify the type of liquid being dispensed. An electromagnetically operated slidable lock on the lever arm locks the dosing apparatus in position. The dosing apparatus is clamped to the bottle of liquid to be dispensed and has a code on its side such that the optical reader may identify to a controller device the liquid and therefor amount to be dispensed. The lever arm and dosing apparatus are arranged so that depression of the lever arm results in the dispensing of a predetermined liquid amount.

16 Claims, 1 Drawing Figure

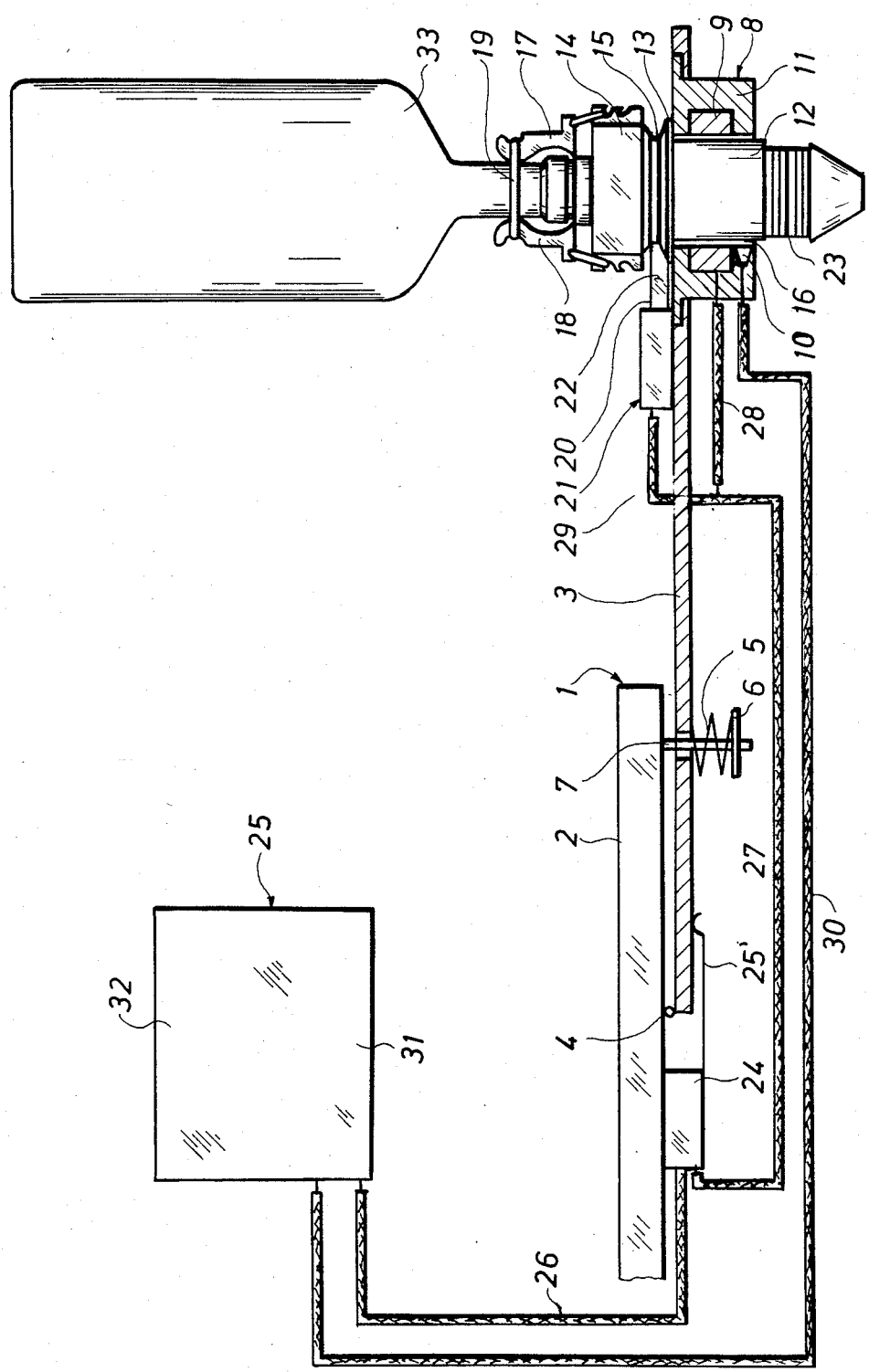

4,660,742

SYSTEM FOR ACTIVATING A DOSING APPARATUS FOR DISPENSING PREDETERMINED QUANTITIES OF A BEVERAGE FROM A BOTTLE

TECHNICAL FIELD

The invention relates to a system for activating a dosing apparatus to dispense predetermined quantities of a beverage from a bottle and comprising a substantially annular electromagnet for receiving during the dispensing the dosing apparatus disposed on the bottle and for opening a valve in the dosing apparatus by activation, said valve enabling the beverage quantity in question to flow out.

BACKGROUND ART

It is known to activate a dosing apparatus by means of a magnet ring to dispense a drink from a bottle; the previously known systems or similar apparatuses used in this connection are, however, encumbered with various draw-backs making it possible to interrupt the dispensing too early.

It is the object of the present invention to procure a system of the above mentioned type ensuring that exactly the predetermined quantity is dispensed at any time.

DISCLOSURE OF INVENTION

This is obtained by the system according to the invention being characterised in that the magnet ring is associated with a locking means for locking the bottle with the dosing apparatus in the magnet ring during the dispensing, and in that the system comprises a control device, which by activation is adapted to control the function of the locking means as well as the function of the magnet ring so that both are kept activated at least until the dispensing of the drink in question has been terminated.

It is hereby obtained that the bottle with the dosing apparatus in question is maintained in the magnet ring with no possibility of the user removing the bottle before the dispensing is terminated, and simultaneously the control device ensures that the magnet ring is kept active too, until the dispensing is terminated. Such a system is especially suited for use in bars and restaurants, and due to this system the customer can be quite certain that the quantity of the drink dispensed is correct.

According to the invention the control device may comprise a reader located in connection with the magnet ring, said reader being adapted to read a code located on the dosing apparatus during the movement of the dosing apparatus into the magnet ring and thereby to activate the remaining part of the control device. It is thus made possible to activate the dosing apparatus automatically.

Furthermore, according to the invention the magnet ring and the locking means may be mounted on a pivotally mounted and spring-biased lever arm, and the control device may be connected with the magnet ring and the locking means by means of a switch capable of cooperating with the lever arm in such a manner that the control device activates the magnet ring and the locking means by means of the switch, when said switch is actuated by the lever arm by its depressing after activation of the control device itself. It is hereby obtained that the automatic dispensing of the drink may be initiated only by depressing the lever arm, but it may of course also be delayed until the depressing, so that the user may control the initiation with great accuracy.

According to the invention the locking means may also comprise a slide activable by means of an electromagnet and adapted to engage the dosing apparatus and to lock it in the magnet ring during the dispensing, whereby the locking is ensured in a simple manner by using electric current already used to activate the magnet ring.

The control device may according to the invention comprise a computer adapted to connect the switch with a power source by means of a signal from the reader and besides to switch off the current to the switch, when a predetermined period of time has passed from the activation of the switch by means of the lever arm, the switch thereby being returned to the starting position from before the actuation of the lever arm. An especially advantageous embodiment of the invention is thereby ob tained.

The computer may according to the invention comprise a registration unit adapted to register the dispensing of the drink in question with regard to number as well as to type, of which the latter is communicated to the computer by means of the code on the dosing apparatus. A reliable control with the number of dispensed drinks of different types is thus ensured.

Furthermore according to the invention the reader may be adapted to register an at least partial withdrawal of the dosing apparatus from the magnet ring, and the control device may be adapted in such a way that the dispensing of a new predetermined quantity of drink is only possible after the reader has registered that the dosing apparatus has been withdrawn at least partially from the magnet ring, whereby an especially advantageous embodiment is obtained.

Finally according to the invention the predetermined period of time, within which the locking means and the magnet ring are kept active, may vary dependent on the type of drink concerned read by the code on the dosing apparatus, whereby an optimum utilization of the device is made possible.

BRIEF DESCRIPTION OF THE DRAWING

The invention will be described below with reference to the accompanying drawing, which is a schematic, partsectional view of the system according to the invention showing a bottle with the dosing apparatus located in the magnet ring of the system and the locking means of the system in locking arrangement with the dosing apparatus.

BEST MODE FOR CARRYING OUT THE INVENTION

The system provided with the general reference number 1 shown in the drawing comprises a lever arm 3 pivotally mounted under e.g. a bar counter 2 and pivotally fastened to the underside of the bar counter 2 by a schematically shown hinge 4 and is maintained by spring load against the underside of the bar counter 2, where the lever arm may abut a stop, not shown. The spring load may be ensured by means of a spring 5 fixed between the underside of the lever arm 3 and a disc 6 secured to a pin 7 which is itself secured to the underside of the bar counter 2. The disc 6 and the pin 7 may if desired be interengaged by means of a thread so that the biasing may be adjusted.

In the end opposite the hinge 4 the lever arm 3 carries an annular device provided with the general reference number 8 and comprising an annular electromagnet or magnet ring 9 as well as an optical reader 10 which are together enclosed in an annular housing 11 of a suitable plastic material.

The annular device 8 with associated magnet ring 9 and optical reader 10 is formed to receive and cooperate with a dosing apparatus 12 secured to a bottle 33. Said dosing apparatus comprises a valve device which by activation of an electromagnet is adapted to start the dispensing of a measured drink in the dosing apparatus 12. At the end adjacent to the bottle the dosing apparatus comprises a circumferential collar 13 which together with a mounting portion 14 defines a circumferential recess 15. The collar 13 is adapted to abut the upper surface (in accordance with the drawing) of the annular device 8, when said dosing apparatus is led completely into the throughgoing hole 16 of the device 8. Together with hinged fastening means 17, 18 the mounting portion 14 of the dosing apparatus 12 enables the dosing apparatus 12 to be fastened at the orifice of the bottle 33, the fastening means being secured to the bottleneck by means of a clamp 19.

The circumferential recess 15 on the dosing apparatus 12 is adapted—when the collar 13 abuts the annular device 8—to cooperate with a slide bar 20, which belongs to a locking means provided with the general reference number 21, and is mounted on the upper side of the lever arm 3 immediately adjacent to the passage 16 of the annular device 8. The locking means 21 is constructed in such a way that the slide bar 20 is displaced forwards and backwards substantially radially relative to the passage 16 of the annular device 8 by means of an electromagnet. The locking means 21 is further constructed so that the slide bar 20 in its projecting position locks the dosing apparatus 12 in the annular device 8, when the collar 13 abuts its upper side. The withdrawn position of the slide bar 20, in which the dosing apparatus 12 may freely be pushed out of and into the annular device 8, is indicated by dotted lines 22.

In a circumferential groove the dosing apparatus 12 carries a code 23 suitably formed on a strip glued to the dosing apparatus. Said code, which in a well-known manner consists of dashes, indicates e.g. the type of drink contained in the bottle 33. The code 23 is read by the reader 10 during the passage of said reader in upward as well as downward direction, seen in relation to the drawing.

Furthermore on the underside of the bar counter 2 a switch 24 is located which as indicated in the drawing comprises an activation arm 25' in engagement with the underside of the lever arm 3 and adjusted so that the switch 24 is activated by depressing the lever arm 3 clockwise round the hinge 4.

Besides the system comprises a control device 25 which is connected with the switch 24 by means of an electric wire 26. The switch itself is connected with the magnet ring 9 and the locking means 21, respectively, by means of electric wires 27, 28, and 29, and the control device 25 is further connected with the reader 10.

The control device 25, which may contain a computer 31, is adapted to receive signals from the reader 10 as to the code 23 read on the dosing apparatus 12, so that if the reader 10 reads a code in downward direction relative to the drawing, the switch 24 is put into clear position by being connected with a power source by means of the wire 26. When activating the switch 24 by depressing the lever arm, e.g. by the user actuating the bottle 33 in downward direction, the magnet ring 9 as well as the locking means 21 are connected with the power soure through wires 27, 28, and 29 so that the magnet ring 9 as well as the locking means 21 are activated. The dosing apparatus is thus activated and simultaneously it is locked to the lever arm 3 with associated annular device 8. The computer 31 is adjusted in such a way that the power supply to the switch 24 and thus also to the magnet ring 9 and the locking means 21 is interrupted after a certain period of time, which may suitably be varied dependent on the time it will take the individual type of drink to flow out of the dosing apparatus in the amount adjusted in advance. The switch 24 is adapted to be brought back at the same time to its starting position ready for reactivation by depressing the lever arm 3.

The control device 25 may be adapted so that the switch can only be reactivated after the code 23 has passed the reader 10 in upward direction seen in relation to the drawing.

The locking means 21 is adapted to withdraw the slide bar 20, the moment the power supply is interrupted.

If desired the control device 25 may also contain a registration unit 32 registering the number of drinks dispensed and the type concerned, so that the number of drinks dispensed is currently counted. This may e.g. meet the requirements of authorities as well as owners as to exact and safe surveillance of drinks dispensed.

The present embodiment of the system according to the invention has been described with reference to a schematical view, but it may of course be constructed in many different ways. Furthermore, the magnet ring and the reader are shown incorporated in a common housing 11, whereas the locking means 21 is shown separately relative thereto. If desired the locking means may naturally be incorporated in the same housing, too, and the locking means may have many different shapes according to the outer shape of the dosing apparatus.

In another embodiment of the invention the annular device 8 may be mounted together with the locking means on a supporting means without using a switch 24 so that the activation of the locking means and the magnet ring is effected directly from the control device 25.

I claim:

1. A system for activating a dosing apparatus to dispense predetermined quantities of a beverage from a bottle comprising a substantially annular electromagnet through which a dosing apparatus is disposed, said annular electromagnet being capable of opening and closing a valve within said dosing apparatus, said annular electromagnet being associated with a means for locking said-dosing apparatus within said annular electromagnet while liquid is dispensed, said electromagnet and said locking means being mounted on a pivotally mounted and spring-biased lever arm, said locking means and said annular electromagnet being activated by a control device such that both are activated while said beverage is being dispensed, said control device being connected with said electromagnet and said locking means by a switch capable of cooperating with the lever arm in such a manner that said control device activates said electromagnet and said locking means is activated by the lever arm by depression thereof, after activation of said control device itself.

2. A system for activating a dosing apparatus to dispense predetermined quantities of a beverage from a bottle comprising a substantially annular electromagnet through which a dosing apparatus is disposed, said annular electromagnet being capable of opening and closing a valve within said dosing apparatus, and wherein said annular electromagnet is associated with a means for locking said dosing apparatus within said annular electromagnet while liquid is dispensed, and wherein said locking means and said annular electromagnet are activated by a control device such that both are activated while said beverage is being dispensed, wherein said control device comprises a reader capable of reading a code located on said dosing apparatus during the movement of said dosing apparatus into said annular electromagnet, thereby activating said locking means and said electromagnet, and wherein said annular electromagnet and locking means are mounted on a pivotally mounted and spring-biased lever arm and said control device is connected to said annular electromagnet and locking means through a switch capable of cooperating with said lever arm such that depression of said lever activates said control device and thereby said annular electromagnet and locking means.

3. A system according to claim 2, wherein said locking means comprises an electromagnetically operated slide.

4. A system as in claim 2 wherein said locking means comprises a slide which is slidable by means of an electromagnet and adapted to engage the dosing apparatus and to lock it in said electromagnet during dispensing.

5. A system as in claim 2 wherein said control device comprises a computer adapted to connect the switch with a power source by means of a signal from the reader and also to switch off the current to the switch when a predetermined period of time has passed from the activation of the switch by means of the lever arm, the switch thereby being returned to the starting position from before the actuation of the lever arm.

6. A system as in claim 5 wherein the computer comprises a registration unit adapted to register the dispensing of a drink with regard to number as well as to type, of which the latter is communicated to the computer by means of the code on the dosing apparatus.

7. A system as in claim 2 wherein the reader is adapted to register an at least partial withdrawal of the dosing apparatus from the electromagnet, and wherein the control device is adapted in such a way that the dispensing of a new predetermined quantity of drink is only possible after the reader has registered that the dosing apparatus has been withdrawn at least partially from the electromagnet.

8. A system as in claim 2 wherein the predetermined period of time within which the locking means and the electromagnet are kept active, varies dependent on the type of the drink concerned read by the code on the dosing apparatus.

9. A system as in claim 2 wherein the electromagnet and the reader are embedded in a common housing, so that together they form an annular device.

10. A system for activating a dosing apparatus to dispense predetermined quantities of a beverage from a bottle comprising a substantially annular electromagnet through which a dosing apparatus is disposed, said annular electromagnet being capable of opening and closing a valve within said dosing apparatus, and wherein said annular electromagnet is associated with a means for locking said dosing apparatus within said annular electromagnet while liquid is dispensed, said locking means mounted on a pivotally mounted and spring biased lever arm, and wherein said locking means and said annular electromagnet are activated by a control device by way of a switch such that both are activated while said beverage is being dispensed, said control device comprising a reader capable of reading a code located on said dosing apparatus during movement of said dosing apparatus into said annular electromagnet and a computer adapted to connect the switch with a power source by means of a signal from the reader and also to switch off the current to the switch when a predetermined period of time has passed from the activation of the switch thereby being returned to the starting position from before actuation of the lever arm.

11. A system as in claim 10 wherein the computer comprises a registration unit adapted to register the dispensing of a drink with regard to number and type, of which the latter is communicated to the computer by means of the code on the dosing apparatus.

12. A system for activating a dosing apparatus to dispense predetermined quantities of a beverage from a bottle comprising a substantially annular electromagnet through which a dosing apparatus is disposed, said annular electromagnet being capable of opening and closing a valve within said dosing apparatus, and wherein said annular electromagnet is associated with a means for locking said dosing apparatus within said annular electromagnet while liquid is dispensed, and wherein said locking means and said annular electromagnet are activated by a control device such that both are activated while said beverage is being dispensed, wherein said control device comprises a reader capable of reading a code located on said dosing apparatus during the movement of said dosing apparatus into said annular electromagnet, thereby activating said locking means and said electromagnet, and wherein said annular electromagnet and locking means are mounted on a pivotally mounted and spring-biased lever arm and are activated in response to pivotal movement of the lever arm by the control device which is connected to said annular electromagnet and locking means.

13. A system as in claim 12 wherein said locking means comprises a slide which is slidable by means of an electromagnet and adapted to engage the dosing apparatus and to lock it in the electromagnet during dispensing.

14. A system as in claim 12 wherein the reader is adapted to register an at least partial withdrawal of the dosing apparatus from the electromagnet, and wherein the control device is adapted in such a way that the dispensing of a new predetermined quantity of drink is only possible after the reader has registered that the dosing apparatus has been withdrawn at least partially from the electromagnet.

15. A system as in claim 12 wherein the predetermined period of time within which the locking means and the electromagnet are kept active, varies dependent on the type of the drink concerned read by the code on the dosing apparatus.

16. A system as in claim 12 wherein the electromagnet and the reader are embedded in a common housing, so that together they form an annular device.

* * * * *